US012485592B2

(12) United States Patent
Bak et al.

(10) Patent No.: US 12,485,592 B2
(45) Date of Patent: Dec. 2, 2025

(54) SEALING ELEMENT

(71) Applicant: Aptiv Technologies AG, Schaffhausen (CH)

(72) Inventors: Szymon Bak, Cracow (PL); Artur Kliszka, Cracow (PL)

(73) Assignee: Aptiv Technologies AG, Schaffhausen (CH)

( * ) Notice: Subject to any disclaimer, the term of this patent is extended or adjusted under 35 U.S.C. 154(b) by 135 days.

(21) Appl. No.: 17/980,991

(22) Filed: Nov. 4, 2022

(65) Prior Publication Data

US 2023/0191669 A1 Jun. 22, 2023

(30) Foreign Application Priority Data

Dec. 20, 2021 (EP) .................... 21215877

(51) Int. Cl.
 B29C 44/42 (2006.01)
 B29C 44/12 (2006.01)
 B29C 44/58 (2006.01)
 B29K 75/00 (2006.01)
 B29L 31/34 (2006.01)
(52) U.S. Cl.
 CPC .......... B29C 44/428 (2013.01); B29C 44/12 (2013.01); B29C 44/588 (2013.01); *B29K 2075/00* (2013.01); *B29L 2031/3462* (2013.01)
(58) Field of Classification Search
 CPC . B29C 44/12; B29C 45/14549; B29C 44/588; B29C 33/10; B29C 45/34; B29L 2031/3462
 See application file for complete search history.

(56) References Cited

U.S. PATENT DOCUMENTS

| 3,255,302 | A | 6/1966 | Frank |
| 4,405,083 | A | 9/1983 | Charlebois et al. |
| 2006/0145380 | A1 | 7/2006 | Renkl et al. |
| 2011/0293925 | A1 | 12/2011 | Klann et al. |
| 2014/0079840 | A1* | 3/2014 | Eigler ............... B29C 45/2675 425/192 R |
| 2015/0255941 | A1 | 9/2015 | Kao et al. |
| 2019/0193147 | A1* | 6/2019 | Navarro Teixidó . B22D 21/007 |

FOREIGN PATENT DOCUMENTS

| DE | 202007016674 U1 | 3/2008 |
| DE | 202014105948 U1 | 2/2015 |
| DE | 102019001380 B3 | 8/2020 |
| DE | 102020107547 A1 | 9/2021 |

OTHER PUBLICATIONS

EP Search Report for Application No. 21215877.8, mailed Oct. 6, 2022, 7 pages.

\* cited by examiner

*Primary Examiner* — Jacob T Minskey
*Assistant Examiner* — Elisa H Vera
(74) *Attorney, Agent, or Firm* — Billion & Armitage

(57) ABSTRACT

A sealing element for a molding machine comprises a base body with an inner receptacle wherein the base body is provided with a venting duct to connect an inner receptacle of the sealing element with an outer surface thereof.

20 Claims, 1 Drawing Sheet

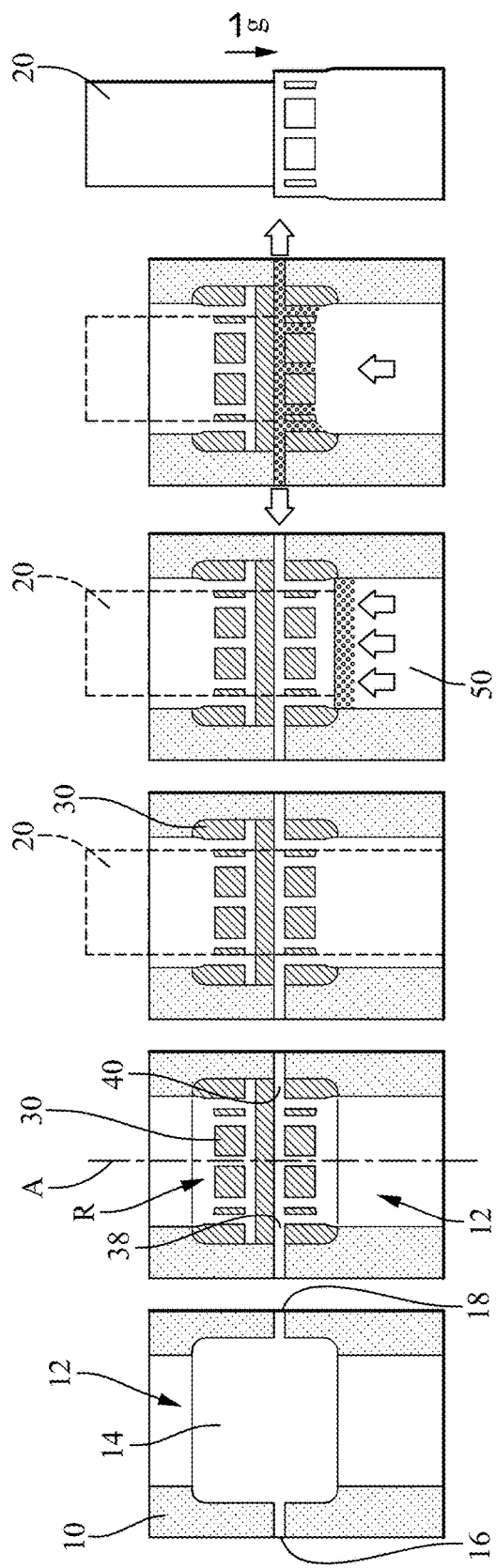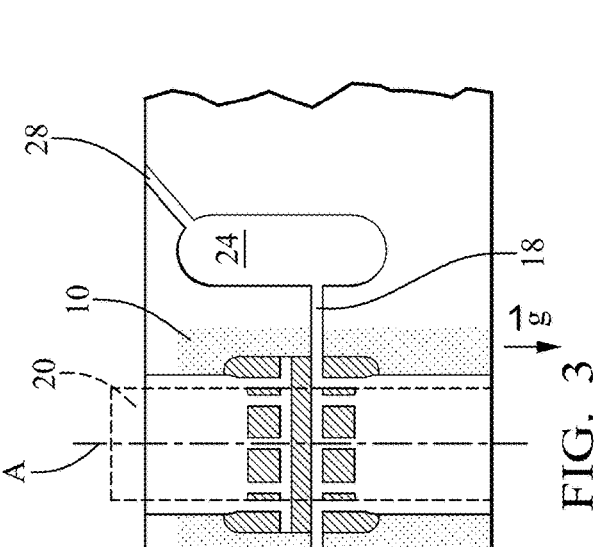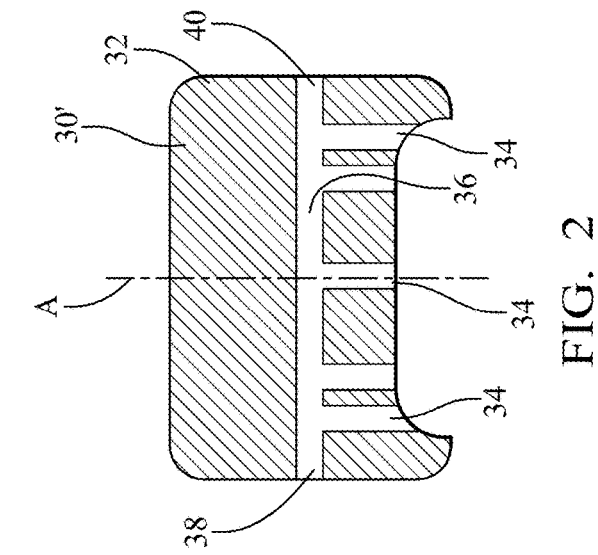

SEALING ELEMENT

CROSS-REFERENCE TO RELATED APPLICATION

This application claims benefit of priority to European Patent Application No. 21215877.8 filed on Dec. 20, 2021, the entire disclosure of which is hereby incorporated by reference.

TECHNICAL FIELD OF THE INVENTION

The present disclosure relates to a sealing element for a molding machine.

BACKGROUND

Highly resistant foam sealing, e.g., polyurethane (PUR) foam sealing, of single cables or wire bundles is known to form e.g., grommets to establish a firewall, to form a splice overmolding, rigid wiring or ring terminal cup. The most common way of creating a seal on a cable is injection of material into a mold through which the cable or wire harness is passing. The openings of the mold through which the wire harness is passing must be sealed to assure that the sealing material forming the overmold is kept within the mold during the injection process.

One of the critical elements in the molding process are the sealing elements which are installed in the mold to assure that overmold material, i.e., PUR foam, is kept within the mold during the first stage of the process. It is known in the art to seal the interface between the product and the mold (mold halves) by means of mechanical seals or flexible seals. These solutions, however, do not allow a controlled venting since the purpose of these seals is to seal the best possible way.

It is also known to provide venting channels and/or venting chambers in a mold. However, these channels and chambers may leave venting marks in the overmold of the final product.

SUMMARY

It is the object of the present application to provide a sealing element which allows for a good sealing between the mold and the product on the one hand and which allows a venting of the mold on the other hand without leaving venting marks on the final product.

As a solution the present application provides a sealing element for a molding machine for providing a product with an overmold by means of injection molding, the sealing element including a base body having an inner receptacle for receiving the product and an outer surface. The base body is provided with a venting duct that connects the inner receptacle with the outer surface of the sealing element.

According to this solution, a proper degassing during the injection molding process is ensured since the bubbled surface of semi-liquid molding material is able to leave the mold through the venting duct of the sealing element. This provides a high quality and a smooth surface of the final product. Any material that is left in the venting duct can be easily removed or can be left at the outer circumference of the product in the form of a thin web and/or ring. According to this solution the highest point in a molding machine can be vented without leaving venting marks on the final product.

The term injection molding according to the present disclosure includes all variants of injecting material in a mold such as injections of thermoplastic material, holt melt material, PUR material, 2K PUR material or the like.

According to an embodiment, the sealing element may consist of soft foam material that includes a rubber material, such as synthetic rubber or natural latex, silicone, a polyurethane material or is made of rubber foam or of polyurethane foam. Also, a hard material such as polytetrafluoroethylene (PTFE) may be used. Such sealing elements can be produced in an efficient manner, may have a closed cell structure and provide sufficient elasticity and resiliency to seal products having varied outer contours. A closed cell structure provides very good properties as regards resiliency.

According to a further embodiment, the sealing element is removably inserted in a pocket of the mold. This allows for an exchange of the sealing element to match the outer diameter of the product.

According to an embodiment, the inner receptacle of the base body extends along a longitudinal axis of the sealing element. The venting duct includes an axially extending section. In this embodiment the venting duct includes a section that extends in parallel to the longitudinal axis of the sealing element. Since the sealing element surrounds the product and the overmold material is injected in the space between the product and the mold, any gas or bubbles will be expelled through the axially extending section of the venting duct when the overmold material is injected into the mold. Of course, the inner receptacle may also have the shape of a thread or the like that extends along the longitudinal axis.

According to a further embodiment, the venting duct includes a plurality of parallel and axially extending sections. This allows for a uniform degassing along the circumference of the product.

According to a further embodiment, the venting duct includes a radially extending section to expel gas or bubbles without affecting the sealing properties of the sealing element.

According to a further embodiment, the axially extending sections merge into an annular section of the venting duct to provide an equalized degassing.

The present application also includes a molding machine for providing a product with an overmold by means of injection molding. The molding machine includes a mold with a cavity for receiving the product. A sealing element as disclosed above is provided in the mold to seal the cavity.

The mold can constitute an integrated part of the molding machine or the molding machine may have the form of separate station where the injection is made.

According to an embodiment, the molding machine is configured in an operational configuration such that cavity of the mold is oriented in a vertical direction such that gas or bubbles of overmold material will gather at the top of the overmold material between the product and the mold.

According to a further embodiment, the sealing element is received in a pocket of the mold. The mold is provided with a venting duct that communicates with the pocket. In this embodiment the venting duct of the mold is located immediately adjacent the sealing element such that the gas is able to leave the mold cavity in an upward direction opposite to the force of gravity.

According to a further embodiment, the sealing element is received in a pocket of the mold. The mold is provided with a venting chamber that communicates with the pocket. In this arrangement any gas or bubbles can be expelled out of the mold by forcing enough overmold material into the venting chamber until no gas remains in the cavity of the mold.

The present application also includes a method of providing a product with an overmold by means of injection molding in a molding machine as disclosed above. The method includes the steps of inserting the sealing element in a pocket of the mold, placing the product in the cavity such that the sealing element seals the product against the mold and injecting overmold material in the inner receptacle and venting the inner receptacle through the ducts of the sealing element.

In this method the sealing element is used for sealing the product against the mold to avoid that overmold material exits the mold. On the other hand, the sealing element also serves to remove gas or bubbles through the sealing element from an inner space in the mold between the product and the cavity.

According to an embodiment, the product to be sealed is a cable, a cable bundle, a cable harness, a tube or a housing or the like.

BRIEF DESCRIPTION OF THE DRAWINGS

The present invention is now described, by way of example with reference to the accompanying drawings, in which:

FIGS. 1A through 1F show various steps of a molding process according to an embodiment;

FIG. 2 shows a side view of a sealing element according to an embodiment; and

FIG. 3 shows a fragmentary view of a molding machine according to an embodiment.

DETAILED DESCRIPTION

FIG. 1 depicts various steps of a process for providing a product with an overmold by means of injection molding. According to the exemplary embodiment, the product is a cable 20 which will be provided with an overmold of e.g., polyurethane foam material.

The molding machine used for the above process is not shown in detail but includes a split-mold having two mold halves. Only one mold half (hereafter mold 10) is shown in the drawings.

The mold 10 includes a cavity 12 for receiving the cable 20. The cavity 12 is formed along a longitudinal axis A. The mold 10 further includes a pocket 14 for receiving a sealing element 30. The sealing element in each mold has the general shape of a divided sleeve to surround the cable 20 along half of its circumference.

FIG. 2 shows a further embodiment of a sealing element 30' consisting of a base body having an inner receptacle R (see FIG. 1B) for receiving the cable 20. The inner receptacle R of the base body extends along the half circumference of the cable 20. The base body further includes an outer surface 32 which extends along the outer circumference of the sealing element 30'. Further, the base body of the sealing element 30' is provided with a venting duct that connects the inner receptacle R with the outer surface 32 of the sealing element.

As shown in FIG. 1B and FIG. 2 the inner receptacle R of the sealing elements 30, 30' extends along a longitudinal axis A and the venting duct provided in the base body includes a plurality of axially extending sections 34 that merge into an annular section 36 of the venting duct. Further, two radially extending sections 38, 40 also merge into the annular section 40 as shown in FIG. 2.

When a cable 20 is inserted into the inner receptacle R formed by the sealing elements 30, 30' the axially extending sections 34 and the annular section 36 of the venting duct are closed by the outer jacket of the cable such that gas entering the axially extending sections 34 may proceed through the annular section 36 towards the radially extending sections 38 to exit the sealing element. To allow the gas to escape the mold, the mold 10 is provided with two venting ducts 16, 18 leading to respectively one venting chamber 22, 24 (see FIG. 3) of the molding machine. The venting chambers 22 and 24 are connected to atmosphere by means of further venting ducts 26, 28.

As can be seen from a comparison of FIGS. 1B through 1E and FIG. 2, the sealing elements 30 and 30' have a similar shape and design. In contrast to the sealing element 30 which can be inserted in the pocket 14 of the mold 10 upside-up or upside-down, the sealing element 30' needs to be inserted in the pocket 14 such that the axial sections 34 of the venting duct are oriented in a downward direction.

A method of providing a cable 20 with an overmold by means of injection molding in a molding machine as described above is now described with reference to FIGS. 1A through 1F.

FIG. 1A shows an empty mold 10 (mold half). In FIG. 1B the sealing element 30 is inserted into the pocket 14 of the cavity 12 such that the radially extending sections 38 and 40 of the venting duct of the sealing element 30 are aligned with the venting ducts 16 and 18 of the mold 10.

Thereafter, a cable 20 is inserted in the inner receptacle R of the sealing element 30 and the second mold half (not shown) also provided with a sealing element 30 in the above manner is closed against the mold 10. Thereafter, the sealing elements 30 seal the cable 20 against the surrounding wall of the molds 10.

In the next step shown in FIG. 1D an overmold material 50, e.g., PUR foam material, is injected in the space between the cable 20 and the surrounding molds. During this process step the overmold material expands and fills the mold to form the final shape of the product. The surface of the injected overmold material includes gas and bubbles and this semi-liquid overmold material is expelled through the axially extending sections 34, the annular section 36, the radially extending sections 38, 40 of the sealing element and through the venting ducts 16, 18 of the mold. Excess material is collected in the venting chambers 22 and 24. Thereafter, the space between the cable 20 and the mold 10 has been completely filled with overmold material. After the two mold halves are opened and the cable 20 is removed, the cable is provided with an overmold surrounding the outer jacket of the cable and having an annular ring at the top of the overmold which is connected to the remainder of the overmold by means of a plurality of axially extending webs.

Since the cable 20 is oriented in the mold in a vertical direction (in parallel to the direction of the force of gravity g) operationally, any gas within the mold will move in an upward direction towards the sealing element 30, 30'. Therefore, no gas remains within the mold after a certain amount of overmold material has been injected into the venting chambers 22 and 24. After the process, any material left in the venting ducts of the mold or in the venting chambers can be easily removed. The material formed at the outer jacket of the cable 20 can remain and has an unblemished attractive appearance.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "includes," and/or "including," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. A sealing element for a molding machine for providing a product with an overmold by means of injection molding, the sealing element comprising:
    an elastic and resilient base body formed of a polymeric material and having an inner receptacle for receiving the product and having an outer surface, wherein the sealing element is configured to be received within a mold having a cavity, wherein the sealing element is configured to provide a seal between surrounding walls of the mold and the product, and wherein the base body is provided with a venting duct that connects the inner receptacle with the outer surface of the sealing element.

2. The sealing element according to claim 1, wherein the venting duct comprises a radially extending section.

3. The sealing element according to claim 1, wherein the inner receptacle extends along a longitudinal axis of the sealing element.

4. The sealing element according to claim 3, wherein the venting duct comprises an axially extending section.

5. The sealing element according to claim 4, wherein the venting duct comprises a plurality of parallel and axially extending sections.

6. The sealing element according to claim 5, wherein the axially extending sections merge into an annular section of the venting duct.

7. The sealing element according to claim 6, wherein the annular section merges into a radially extending section.

8. The sealing element according to claim 1, wherein the sealing element is in contact with the surrounding walls of the mold.

9. The sealing element according to claim 1, wherein the polymeric material forming the base body comprises a foam material.

10. The sealing element according to claim 9, wherein the foam material is a closed cell foam material.

11. A molding machine for providing a product with an overmold by means of injection molding, said molding machine comprising:
    a mold with a cavity for receiving the product, wherein a sealing element is provided in the mold to seal the cavity, the sealing element having an elastic and resilient base body formed of a polymeric material and further having an inner receptacle for receiving the product and an outer surface, wherein the sealing element is configured to provide a seal between surrounding walls of the mold and the product, and wherein the base body is provided with a venting duct that that connects the inner receptacle with the outer surface of the sealing element.

12. The molding machine according to claim 11, being configured in an operational configuration such that the cavity is oriented in a vertical direction.

13. The molding machine according to claim 11, wherein the sealing element is received in a pocket of the mold.

14. The molding machine according to claim 13, wherein the mold is provided with a venting duct that communicates with the pocket.

15. The molding machine according to claim 13, wherein the mold is provided with a venting chamber that communicates with the pocket.

16. A method of providing a product with an overmold by means of injection molding in a molding machine having a mold with a cavity for receiving the product, wherein a sealing element is provided in the mold to seal the cavity, the sealing element having an elastic and resilient base body formed of a polymeric material and having an inner receptacle for receiving the product and an outer surface and wherein the base body is provided with a venting duct that that connects the inner receptacle with the outer surface of the sealing element, the method comprising:
- inserting the sealing element in a pocket of the mold;
- placing the product in the cavity such that the sealing element provides a seal between surrounding walls of the mold and the product; and
- injecting overmold material in the inner receptacle and venting the inner receptacle through the venting duct of the sealing element.

17. The method according to claim 16, wherein the product comprises a cable.

18. The method according to claim 16, further comprising placing the sealing element in contact with the surrounding walls of the mold.

19. The method according to claim 16, wherein the polymeric material forming the base body comprises a foam material.

20. The method according to claim 19, wherein the foam material is a closed cell foam material.

* * * * *